(12) United States Patent
Moore (10) Patent No.: US 8,151,303 B2
(45) Date of Patent: Apr. 3, 2012

(54) TELEVISION DEVICE AND METHOD OF IDENTIFYING CONSECUTIVE PROGRAMMES

(75) Inventor: Nigel Moore, Berkshire (GB)

(73) Assignee: Sony United Kingdom Limited, Weybridge (GB)

( * ) Notice: Subject to any disclaimer, the term of this patent is extended or adjusted under 35 U.S.C. 154(b) by 730 days.

(21) Appl. No.: 11/837,215

(22) Filed: Aug. 10, 2007

(65) Prior Publication Data

US 2008/0052743 A1 Feb. 28, 2008

(30) Foreign Application Priority Data

Aug. 25, 2006 (GB) .................................. 0616903.1

(51) Int. Cl.
*G06F 3/00* (2006.01)
*G06F 13/00* (2006.01)
*H04N 5/445* (2011.01)

(52) U.S. Cl. ................................ 725/46; 725/39; 725/55

(58) Field of Classification Search ............... 725/37–61
See application file for complete search history.

(56) References Cited

U.S. PATENT DOCUMENTS

| | | | |
|---|---|---|---|
| 6,216,264 B1 * | 4/2001 | Maze et al. | 725/53 |
| 6,549,929 B1 * | 4/2003 | Sullivan | 718/102 |
| 6,591,421 B1 * | 7/2003 | Sullivan | 725/50 |
| 6,973,663 B1 * | 12/2005 | Brown et al. | 725/39 |
| 7,299,483 B2 * | 11/2007 | Williams | 725/22 |
| 7,454,775 B1 * | 11/2008 | Schaffer et al. | 725/46 |
| 7,600,246 B2 * | 10/2009 | Taylor et al. | 725/58 |
| 2001/0027562 A1 * | 10/2001 | Schein et al. | 725/43 |
| 2003/0154493 A1 * | 8/2003 | Kagle et al. | 725/114 |
| 2005/0055715 A1 * | 3/2005 | Minnick et al. | 725/58 |
| 2005/0204388 A1 * | 9/2005 | Knudson et al. | 725/58 |
| 2006/0078299 A1 * | 4/2006 | Hasegawa | 386/83 |
| 2007/0199030 A1 * | 8/2007 | Ellis et al. | 725/87 |
| 2008/0184308 A1 * | 7/2008 | Herrington et al. | 725/43 |
| 2009/0293089 A1 * | 11/2009 | Taylor et al. | 725/53 |

FOREIGN PATENT DOCUMENTS

| | | |
|---|---|---|
| EP | 1 355 489 A2 | 10/2003 |
| JP | 2000-324006 | 11/2000 |
| JP | 2005-311561 | 11/2005 |

OTHER PUBLICATIONS

"iGUIDE v0.95 User Guide", Nov. 2006, 18 Pages, http://www.shinyford.co.uk/toppy/iguide.pdf.

* cited by examiner

*Primary Examiner* — Scott Beliveau
*Assistant Examiner* — Alexander Q Huerta
(74) *Attorney, Agent, or Firm* — Oblon, Spivak, McClelland, Maier & Neustadt, L.L.P.

(57) ABSTRACT

A television device for receiving and storing an electronic programme guide, the electronic programme guide including a plurality of programme entries for respective television programmes, each programme entry having a title field including title data for the title of the respective programme and having a timing field including timing data for timing of the respective programme. Title fields of the electronic programme guide are searched to find titles matching the title of the start programme and candidate programmes are identified accordingly. The timings of the identified candidate programmes are compared with a timing profile representing expected consecutive programme occurrences. On the basis of correlation of the timing data with the timing profile, a consecutive programme in the programme series is identified.

30 Claims, 9 Drawing Sheets

Fig 4

| TITLE (32) | START/END TIME (34) | DESCRIPTION |
|---|---|---|
| ... | ... | ... |
| ... | ... | ... |
| | ... | |

|   | PROGRAMME | SCORE VALUE |
|---|---|---|
| 1 | A | 40% |
| 2 | B | 100% |
| 3 | C | 40% |
| 4 | D |  |
| 5 | E |  |
| 6 |   |  |
| 7 |   |  |
| 8 |   |  |

TELEVISION DEVICE AND METHOD OF IDENTIFYING CONSECUTIVE PROGRAMMES

BACKGROUND OF THE INVENTION

1. Field of the Invention

The present invention relates to a television device and a method of identifying consecutive programmes, in particular where a television provider transmits a series of consecutive programmes as a programme series and television devices are desired automatically to identify all consecutive programmes of that programme series.

2. Description of the Related Art

Various systems are known for identifying at a user device consecutive television programmes of a programme series. A television provider provides to users an electronic programme guide which includes a plurality of programme entries for respective television programmes. The programme entries can be provided with specific data which links the consecutive programmes or episodes of a programme series such that a television device can recognise from one programme entry the programme entries relating to consecutive programmes of the same programme series.

It is known to provide a television device with a recording function. The television device can be arranged to record consecutive programmes of the same programme series. Having been set to record one programme in the series, which will be described here as the start programme, the television device is arranged to search programme entries of the electronic programme guide for data in those programme entries indicating a corresponding consecutive programme of the programme series.

It is known to conduct this search only at the time of recording the start programme, such that if no consecutive programme yet appears on the electronic programme guide for scheduling reasons or due to some error in the electronic programme guide, further recording of programmes in the programme series ceases. Irrespective, earlier such systems rely on the television provider providing the data linking the consecutive programmes of the programme series.

OBJECTS OF THE INVENTION

It is an object of the present invention to provide an alternative device and method with which to identify consecutive programmes of a programme series.

SUMMARY OF THE INVENTION

According to the present invention, there is provided a method of identifying, from a start programme as previously selected from the electronic programme guide, consecutive programmes of a programme series of which said start programme is a part. The electronic programme guide includes, for each programme, a programme entry with a title field including title data for the title of the programme and a timing field including timing data for the timing of the programme. The method includes searching the title fields of the electronic programme guide for data matching data of the title field for the start programme and identifying as candidate programmes, programmes having programme entries with data matching data of the title field of the start programme. It further includes comparing timing data of timing fields of the programme entries of the candidate programmes with a predetermined timing profile for expected consecutive programme occurrences and identifying, as a consecutive programme, a candidate programme having a programme entry with timing data correlating with the predetermined expected profile.

According to the present invention, there is also provided a television device for receiving and storing an electronic programme guide. The electronic programme guide includes a plurality of programme entries for respective television programmes, each programme entry having a title field including title data for the title of the respective programme and having a timing field including timing data for timing of the respective programme. The device includes a user interface enabling selection of a start programme from the electronic programme guide and a candidate programme processor having a candidate searcher arranged to search the title fields of the electronic programme guide for data matching data of the title field for the start programme and having a candidate identifier arranged to identify, as candidate programmes, programmes having programme entries with data matching data of the title field of the start programme. It also includes a consecutive programme processor having a profile memory storing a predetermined timing profile for expected consecutive programme occurrences, having a comparator arranged to compare timing data of timing fields of the programme entries of the candidate programmes with the predetermined timing profile and having a consecutive programme identifier arranged to identify, as a consecutive programme, a candidate programme having a programme entry with timing data correlating with the predetermined timing profile.

In this way, it is not necessary to receive from the television provider specific data linking consecutive programmes of a programme series.

It will be appreciated that searching only the title field of programme entries in the electronic programme guide will also potentially identify as candidate programmes programme repeats (in other words exactly the same programme being repeated at a different time), "omnibus" editions where a number of consecutive programmes are retransmitted together as a single programme, etc. By comparing the timing data of candidate programmes with the predetermined timing profile, it becomes possible to exclude those unwanted programmes when identifying consecutive programmes of a programme series.

The timing profile can be preset or selected by a user according to the nature of the programme series to be identified and provides a statistical representation of the timing likelihood for the occurrences of consecutive programmes in a programme series. For instance, it is very common for consecutive programmes of a programme series to be provided at approximately the same time each day on consecutive days or to be provided at the same time and day of the week each week. By comparing an appropriate timing profile with timing data for candidate programmes, those programmes which occur at approximately the same time of day (for instance in the evening) will be selected in preference to other candidate programmes at other times of day (for instance repeats during the middle of the day).

Many different ways of comparing and correlating the timing data of candidate programmes with the timing profile can be used. However, preferably, the comparator is arranged to compare the timing data of the timing fields of each candidate programme with the predetermined timing profile and to generate a score value for each respective candidate programme based on a correlation between the timing data and the predetermined timing profile.

The score value can be derived in many ways and take many forms. It is intended to represent how well the timing data for a candidate programme correlates with the timing profile. In this sense, it might most conveniently be represented as a percentage value. Thus, if the timing profile fully expects a consecutive programme to occur at a time 24 hours after the start programme and the timing data of a candidate programme indicates that it is scheduled to be transmitted at that time, a very high score value, for instance 100%, could be given. On the other hand, if the timing data of a candidate programme indicates a scheduled transmission time which is only close to the expected transmission time according to the timing profile, then a reduced score value will be generated, for instance 80%.

Based on the score values generated for respective candidate programmes, it is possible to decide which candidate programmes can be determined to be consecutive programmes of the programme series.

Preferably, the consecutive programme processor further includes a band memory defining a plurality of adjacent ranges of score values belonging to a corresponding ranked plurality of respective bands and a score value comparator arranged to compare the score values of respective candidate programmes with at least the highest range of score values and to assign to the respective band having the highest range of score values each candidate programme having a score value falling within the highest range of score values.

Thus, it is possible to consider only those candidate programmes falling within the highest range of possible score values as being consecutive programmes.

It is possible to choose the highest scoring candidate programme as the next consecutive programme. However, in certain circumstances, comparing score values with ranges of score values can be more effective. In particular, where the next genuine consecutive programme is to be transmitted at a slightly different time to usual, it will achieve a lower score value. However, despite a slightly lower score value, that next programme, as a candidate programme, will appear in the same band. Therefore, even if one candidate programme has a lower score value than the next candidate programme, it can still be recognised as being the next consecutive programme of the programme series.

On some occasions, none of the candidate programmes will have a score value falling within the highest range of score values.

Preferably, the score value comparator is arranged such that, when the score value comparator does not assign any candidate programmes to said respective band having the highest range of score values, the score value comparator compares the score values of respective candidate programmes with an adjacent range of score values lower than the highest range of score values and belonging to a lower-ranked predetermined band and assigns to said lower-ranked predetermined band each candidate programme having a score value falling within the adjacent range of score values belonging to said lower-ranked predetermined band.

If necessary, this can be repeated a number of times such that the score value comparator looks for candidate programmes with score values within successively lower ranges of score values. As soon as a range is established in which at least one candidate programme has a score value, it is possible to identify at least one consecutive programme of the programme series.

In this respect, the consecutive programme identifier can be arranged to identify, as the next consecutive programme, the next scheduled programme assigned to the highest ranked band to which any programme is assigned.

In this way, an attempt is only made to identify the next scheduled programme of the programme series, though embodiments will be possible where a plurality of consecutive programmes of the programme series are all identified as part of the same process.

In a preferred embodiment, having identified the next consecutive programme, this is used as a start programme for repeating the overall process. This approach has been found useful for overcoming problems where the clocks have changed midway through a series, ie due to daylight saving time changes. Also, it allows identification of a series of programmes which, unusually, are transmitted back-to-back through a special day of programming. The programme following the start programme will have a score value, even if slightly reduced, for being close to the transmission time of the start programme. Subsequent candidate programmes will have lower score values probably to the point that some of them will be excluded as consecutive programmes according to the search conducted for the first start programme. However, by identifying the next consecutive programme and then restarting the process using that as the start programme, each of the consecutive programmes will be identified in turn.

The timing profile can take any suitable form allowing easy comparison with the timing data taken from the programme entries in the electronic programme guide and can have a shape plotted with respect to a time axis which, according to experience, best predicts when consecutive programmes are most expected to occur following a start programme. In this respect, it is intended that the timing profile always be considered and applied with reference to the timing of the start programme, for instance considering zero on the time axis to correspond to the timing of the start programme.

Preferably, the timing profile comprises at least a plurality of expected values defined for respective consecutive times and having a repeating pattern with respect to time, the pattern having a repetition period equal to expected occurrences of consecutive programmes of a programme series.

It is expected, in most situations, that a pattern having a 24-hour period will be most suited. Hence, a candidate programme having a timing 24 hours after the start programme will achieve a high correlation and a high score value. If the next consecutive programme does not actually occur for another week, then, of course, there will be six repetitions of the timing profile without any candidate for correlation. However, with the seventh period, the next scheduled programme in the programme series at the same timing in the day as the start programme will have a high correlation and high score value.

The expected values of the timing profile can all have respective amounts selected from zero to a maximum amount.

In this way, where there are times along the timing profile where it is extremely unlikely to find a consecutive programme in the programme series, the expected values can be set to zero. Similarly, at times where it is very likely to find a consecutive programme, for instance with the 24-hour period, the expected values can take the maximum amount. At times in between, the expected values can have varying amounts according to the profile best suited to the application.

The amounts can be given as percentages, in other words from zero to 100%. Thus, where a candidate programme has a timing matching a portion of the timing profile with an amount of 100%, then the respective candidate programme is given a score value of 100%. This is a very effective and convenient way of scoring the candidate programmes with reference to the timing profile.

As will be apparent from the above, preferably, at reoccurring time intervals corresponding to the repetition period of the timing profile, the expected values are the maximum amount, for instance 100%, where percentages are used.

Because television programmes usually occur over some time, for instance half an hour or one hour, it has been found that timing profiles are most effective which use respective reoccurring time intervals which have a predetermined extent, for instance 30 minutes either side of their main timing. Thus, it is possible for a candidate programme to be given a maximum score value according to correlation of its timing data with the timing profile, even if that timing data does not exactly match the expected timing for a consecutive programme. A time interval is provided about that expected timing which has expected values of the maximum amount for all times within that time interval. This avoids slight changes in scheduling times from significantly affecting application of the timing profile.

Preferably, adjacent expected values in directions away from the respective reoccurring time intervals have progressively smaller amounts.

In a simple example, this would mean that the expected values ramp down to zero either side of the expected values with maximum amount. The ramps could have a linear or curved form. Similarly, the extent to which they fall off will depend on the particular application and how well the timing of consecutive programmes can be predicted.

The part of the timing profile where adjacent expected values have progressively smaller amounts allow candidate programmes to be allocated lower score values. It may transpire, if no candidate programmes have higher score values, that these candidate programmes should be identified as consecutive programme.

The timing profile could be provided as a relatively coarse stepped profile, for instance with expected values being provided for every 15-minute time slot. However, preferably, adjacent expected values form a substantially continuous profile. In practice, this might still take a notionally digital form, for instance with expected values given for every 1-minute time slot.

Preferably, the timing profile takes the shape of a plurality of truncated triangles respectively centred and having truncated flat tops at the expected occurrence of consecutive programmes.

Starting from the mid-point of the start programme, there will be a flat-top section of for instance 30 minutes having expected values of the maximum amount, for instance 100%, then a ramp-down over another period, for instance 5 hours 30 minutes, to expected values of zero. In building up to the next expected occurrence of a consecutive programme, the profile will then ramp up from zero to a maximum amount, for instance starting from zero at 18 hours after the start time and reaching the maximum amount 23 hours 30 minutes after the start time. The profile then has a further period with expected values of the maximum amount centred on the expected time of occurrence of the next consecutive programme (for instance 30 minutes either side of that expected time). The profile can then continue with the same shape and its repetition period.

Many different processes will be available for comparing the data of the title field of the start programme with the data of the title fields of other programme entries in the electronic programme guide. In its most basic form, a direct character-for-character comparison can be made. Improvements to this can include ignoring the case of the characters. Also, routines may be possible whereby certain characters, such as punctuation marks and spaces, or even short strings of letters, such as "and" and "the", can be ignored in the comparison. Also, to take account of spelling mistakes, it is possible for the comparison to allow differences of a certain number of characters, the number of differences perhaps being linked to the overall length of the character strings being compared.

Preferably, the candidate identifier is arranged to identify no more than a predetermined number of candidate programmes by identifying the predetermined number of candidate programmes scheduled first for broadcast.

This is particularly advantageous where the overall process is intended to be used repeatedly and, on each run of the process, to find only the next consecutive programme of the programme series. It becomes possible to limit the number of candidate programmes to a number which can be effectively and efficiently processed. By choosing for instance eight candidate programmes, it is possible that perhaps a candidate programme is picked for each day of the week, even when the programme series repeats only once each week, the consecutive programme processor then picking out only the one weekly repeat from the eight candidate programmes.

The television device can include a record controller arranged to control recording of a broadcast programme on the basis of the timing data in the timing field of the broadcast entry for the broadcast programme in the electronic programme guide.

In other words, the television device is able to initiate recording of programmes either internally within the television device itself or externally in a separate recording device.

The record controller can be responsive to selection of a start programme by the user interface to control recording of the start programme and consecutive programmes identified by the consecutive programme identifier.

Thus, having used the television device to record a start programme, the process of the present invention can be used automatically to record consecutive programmes which are part of the same broadcast series.

The television device may be provided as part of a video recorder and/or a television receiver. Alternatively, it can be embodied in a separate set-top box for controlling other television devices. Indeed, it could be embodied in a personal computer having appropriate software configuring the personal computer to operate as the television device.

It is also possible for the invention to be carried out remotely from any recording device, for instance as part of a client-server or peer-to-peer system in which an algorithm embodying the present invention is run remotely from the recording device based on the information provided regarding the start programme. Information regarding that start programme could be provided directly to the device carrying out the present invention or could be provided to that device by means of the television recording device. The television recording device then receives signals from which it can set its own timer/EPG/operating system to perform the series recording.

Thus, according to the present invention, there is also provided a device for receiving and storing an electronic programme guide. The electronic programme guide includes a plurality of programme entries for respective television programmes, each programme entry having at least a title field including title data for the title of the respective programme and having at least a timing field including timing data for timing of the respective programme. The device includes an interface configured to receive information representative of a start programme in the electronic programme guide and a candidate programme processor having a candidate searcher arranged to search the title fields of the electronic programme guide for data matching data of the title field for the start programme and having a candidate identifier arranged to identify, as candidate programmes, programmes having programme entries with data matching data of the title field of the start programme. It also includes a consecutive programme processor having a profile memory storing a predetermined timing profile for expected consecutive programme occurrences, having a comparator arranged to compare timing data of timing fields of the programme entries of the candidate programmes with the predetermined timing profile and having a consecutive programme identifier arranged to identify, as a consecutive programme, a candidate programme having a programme entry with timing data correlating with the predetermined timing profile and an interface configured to send to a remote television recording device information corresponding to recording instructions for recording of at least the identified candidate programme by the television recording device.

This may be embodied as software on a computer remote from one or more television recording devices. It could be embodied in a number of different devices, such as a server, mobile telephone, television receiver or personal computer connected to the internet.

As mentioned above, the device is preferably configured to receive information representative of a start programme, is arranged to calculate consecutive programmes therefrom and is configured to send information corresponding to recording instructions to the one or more television devices.

According to the present invention, there is also provided a television system including such a device, together with a television device having an interface configured to receive the information corresponding to recording instructions.

The present invention also provides program code means and a computer program product comprising such program code means stored on a computer-readable medium for performing the method of the invention.

DETAILED DESCRIPTION OF THE PREFERRED EMBODIMENTS

The invention will be more clearly understood from the following description, given by way of example only, with reference to the accompanying drawings.

Figure 1:
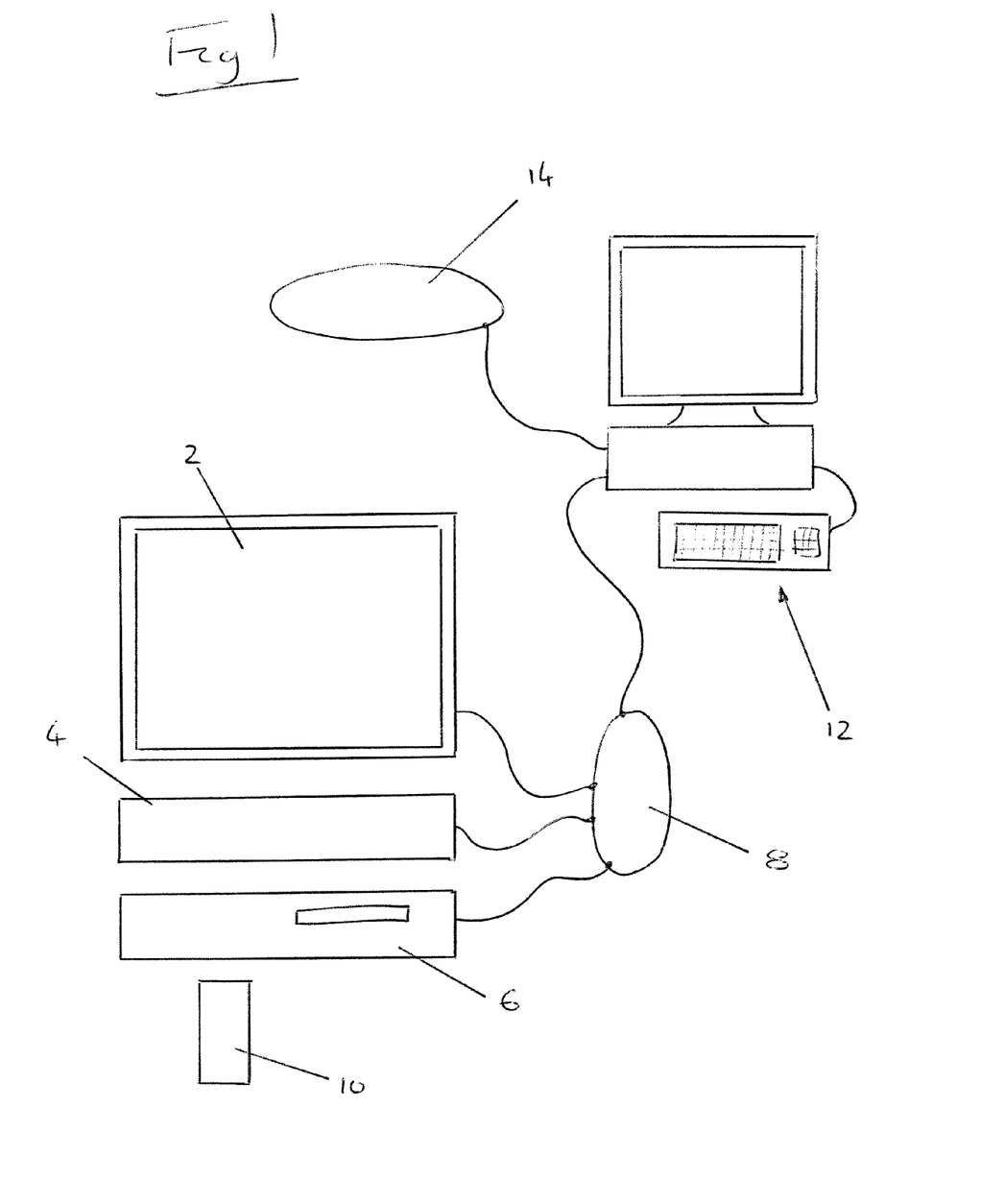
FIG. 1 illustrates a television system including a number of devices which could embody the present invention.

Various television devices are available for use individually or in combination. FIG. 1 illustrates a system including a number of such devices. As illustrated, the devices are able to communicate and are interconnected via a network, for instance IEEE 1394. The television device of the present invention can be embodied in any of these devices or distributed between the various devices. However, the television device of the present invention can also be embodied in any one of these devices for use in a system arrangement other than that illustrated.

As illustrated, a television display device 2 is provided to display television programmes transmitted or broadcast from a broadcast provider. The television display device 2 may include a receiver for receiving the television programmes via an aerial, satellite, cable, etc. Alternatively or in addition, receivers may be provided in a set-top box 4 or a video recorder 6, connected with the television display device 2, for instance via a local network 8. The set-top box 4 could be provided specifically for receiving programmes transmitted by a particular broadcast provider and/or could include a television device according to the present invention. The video recorder 6 could take the form of any type of video recorder, including a personal video recorder (PVR). Again, the video recorder 6 could include a television device according to the present invention.

A remote control 10 is provided for controlling one or more of the television display device, set-top box 4 and video recorder 6. The remote control 10 at least provides a user interface for the television device of the present invention, but might also be provided to control one or more of the television display device 2, set-top box 4 and video recorder 6.

Where one of the television display device 2, set-top box 4 and video recorder 6 receive an electronic programme guide from the broadcast provider and provide this for display on the television display device 2, the remote control 10, as used as a user interface, can be used to select programmes from the electronic programme guide. In this respect, it can be used to select what will be described as a "start programme". This might be a programme which is selected by the user to be recorded by the video recorder 6 and is one of a series of programmes forming part of a broadcast series transmitted by the broadcast provider.

FIG. 1 also illustrates a personal computer 12, which can be configured to embody the television device of the present invention. By means of the network 8, the personal computer 12 can be used to control the video recorder 6 at least. In one embodiment, the personal computer 12 can be connected to services from the broadcast provider, for instance by means of the internet 14. Irrespective, the personal computer 12 obtains the data of the electronic programme guide in order to act as the television device of the present invention.

Figure 2:
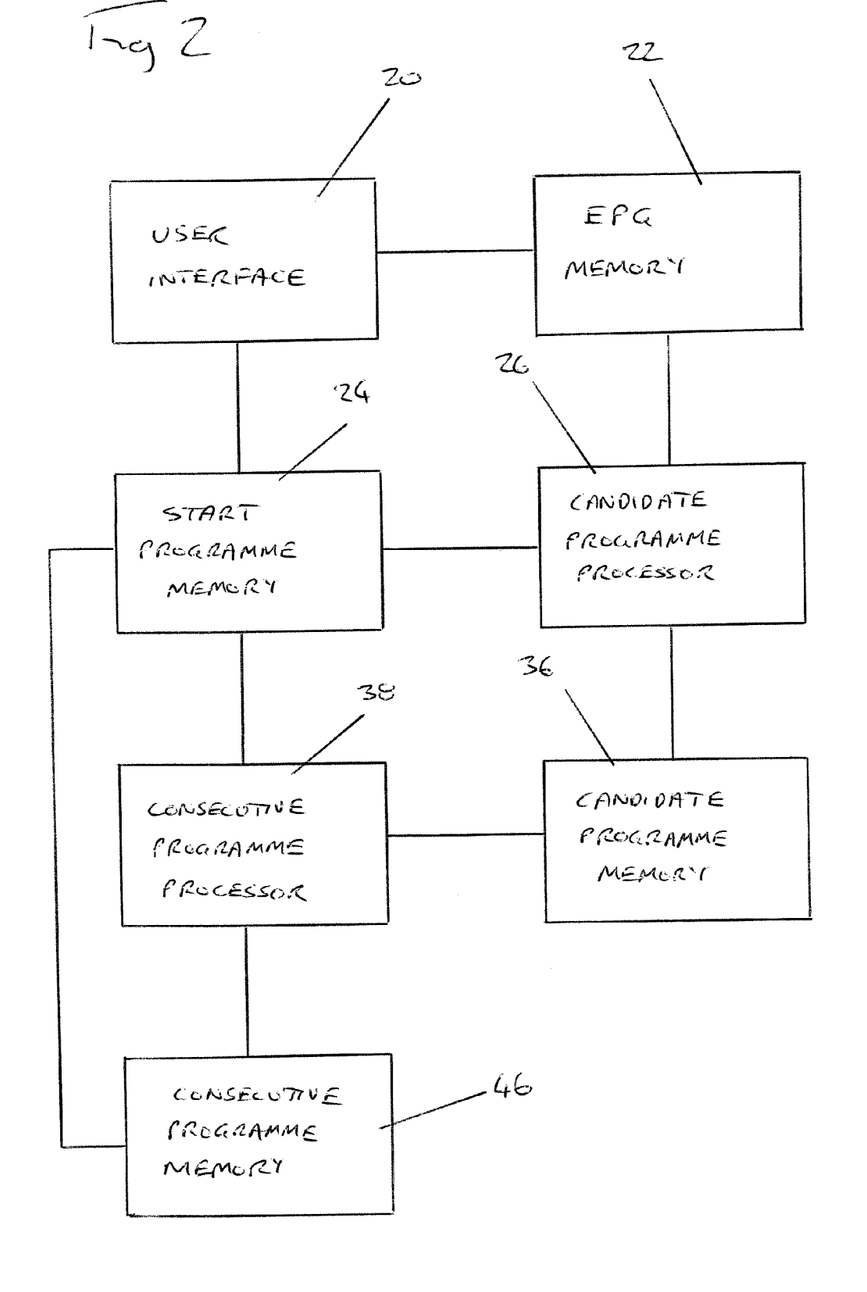
FIG. 2 illustrates schematically an embodiment of the present invention.

FIG. 2 illustrates schematically functional parts of a television device embodying the present invention.

As mentioned above, a user interface 20 is able to access the information of an electronic programme guide provided by a broadcast provider and illustrated schematically as stored in an EPG memory 22.

The user interface 20 is arranged to enable a user to select a start programme. This is illustrated schematically as memory 24. The complete data for that start programme can be stored in a separate memory 24 or, alternatively, it is only necessary to keep a record of a pointer to the information maintained in the electronic programme guide itself.

The present invention is particularly applicable to the situation where the start programme selected by the user interface 20 is a programme to be recorded for the user. Hence, other functional components, for instance as part of the video recorder 6 of FIG. 1, can be configured to record the corresponding television programme as identified by the start programme information taken from the electronic programme guide.

Where the start programme is a programme from a programme series, the present invention enables other programmes of that programme series to be identified. In particular, the video recorder 6 can be configured automatically to record those other programmes in the series.

As illustrated in FIG. 2, a candidate programme processor 26 is arranged to compare the data of the start programme with the data of other programmes in the electronic programme guide.

Figure 3:
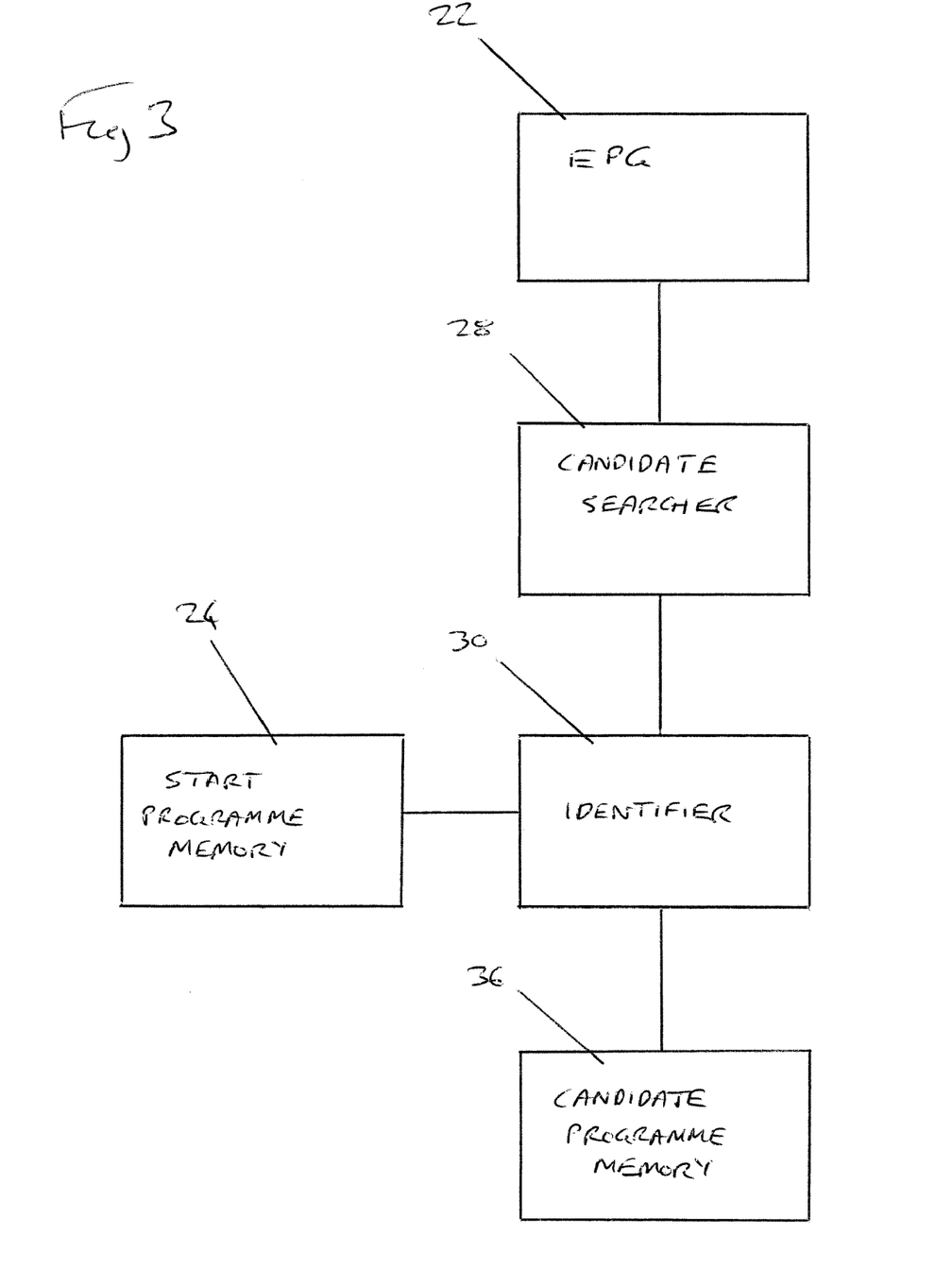
FIG. 3 illustrates schematically the candidate programme processor of FIG. 2.

As illustrated schematically in FIG. 3, the candidate programme processor 26 can be considered to include a candidate searcher 28 and an identifier 30.

The candidate searcher 28 is arranged to search through the data stored in the electronic programme guide memory 22. In particular, the candidate searcher is arranged to search through the title field of each programme entry.

Figure 4:
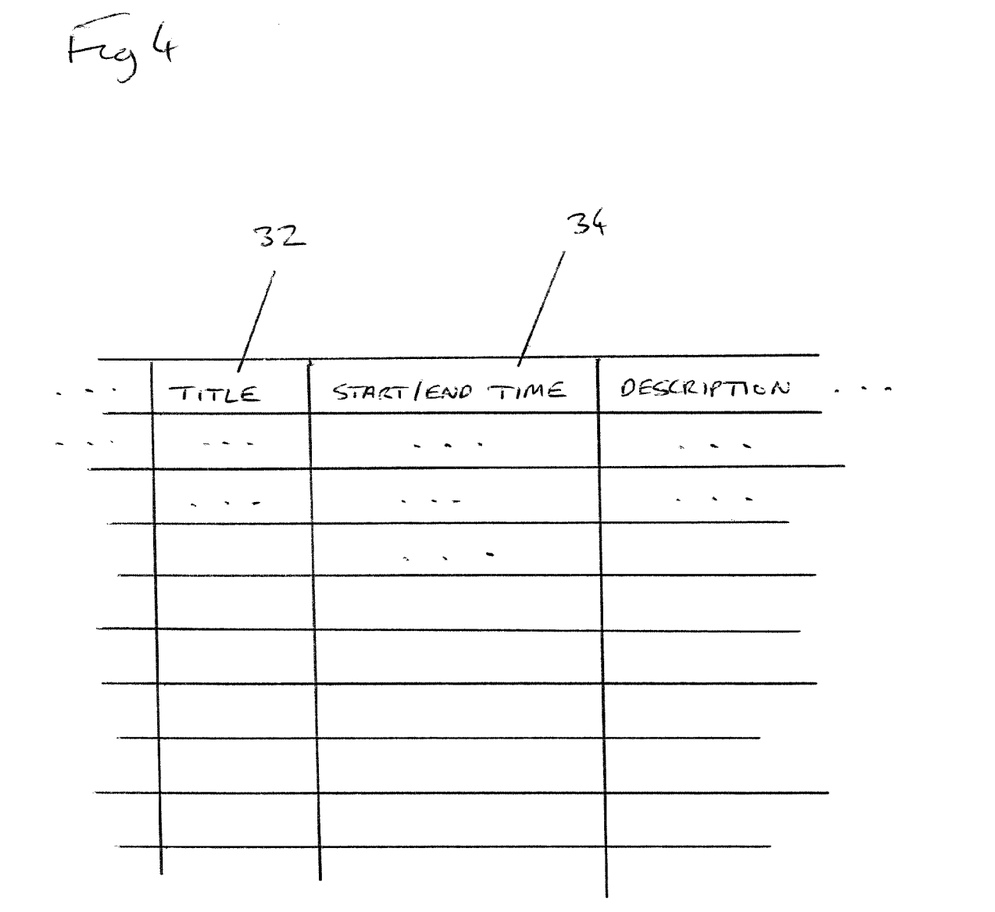
FIG. 4 illustrates schematically data of an electronic programme guide.

FIG. 4 illustrates schematically a series of programme entries as stored for the electronic programme guide.

As illustrated, for each television programme, there is a programme entry having a number of fields including various information, such as programme channel, genre of the programme, description of the programme, etc. Importantly for the present invention, the electronic programme guide will include title information and also timing information. As illustrated, these are provided respectively in a title field 32 and a timing field 34.

The candidate searcher searches the title fields of the electronic programme guide for titles which match the title of the start programme and, together with the identifier 30, identifies programmes which have matching titles. These identified programmes are considered as candidates for being programmes in the same programme series as the start programme.

As illustrated schematically, a candidate programme memory 36 can be provided for storing the data of these candidate programmes, though, as with the start programme memory, pointers can be provided to the corresponding data in the electronic programme guide.

The process of matching or identifying titles in the electronic programme guide which match the title of the start programme can take many forms. In its simplest form, the process will look for a direct match. However, more complicated comparison processes may be used, for instance ignoring in the comparison differences in character sets (eg, ASCII or Latin-5) and/or case (upper or lower). Similarly, punctuation may be ignored as well as short words, such as "and" and "the", etc. Diacritical marks, such as accents in French character sets or umlauts in German character sets may be translated to corresponding characters in a predetermined system default character set, such as an English character set. Thus, generally, diacritical marks will be removed. Processes are also available in which minor differences can be ignored for the sake of matching. In particular, this is used to take account of spelling mistakes and/or spelling differences, for instance between American and English spelling. The process could allow for a predetermined number of character differences or the number of character differences could be varied according to the overall length of the character string being compared.

At this stage, the system will have arrived at a list of candidate programmes having matching titles. The present application recognises that these candidate programmes are not necessarily the programmes which will be required by the user. In particular, in a programme series, individual programmes are often repeated at alternative times. For instance, each programme in the series may first be broadcast in the evening and then repeated the following afternoon. Using only the titles to match programmes and arriving at the candidate programme list, the system would provide (and perhaps record) all the repeats in the series. Other situations arise where a current series is broadcast at one time of the day and a previously broadcast series (having the same name) is broadcast at a different time of the day. Again, using the candidate programme list alone would provide the user with the programmes from both series.

As illustrated schematically in FIG. 2, a consecutive programme processor 38 is provided to overcome this problem. Functional details of the consecutive programme processor 38 are illustrated schematically in FIG. 5.

Figure 5:
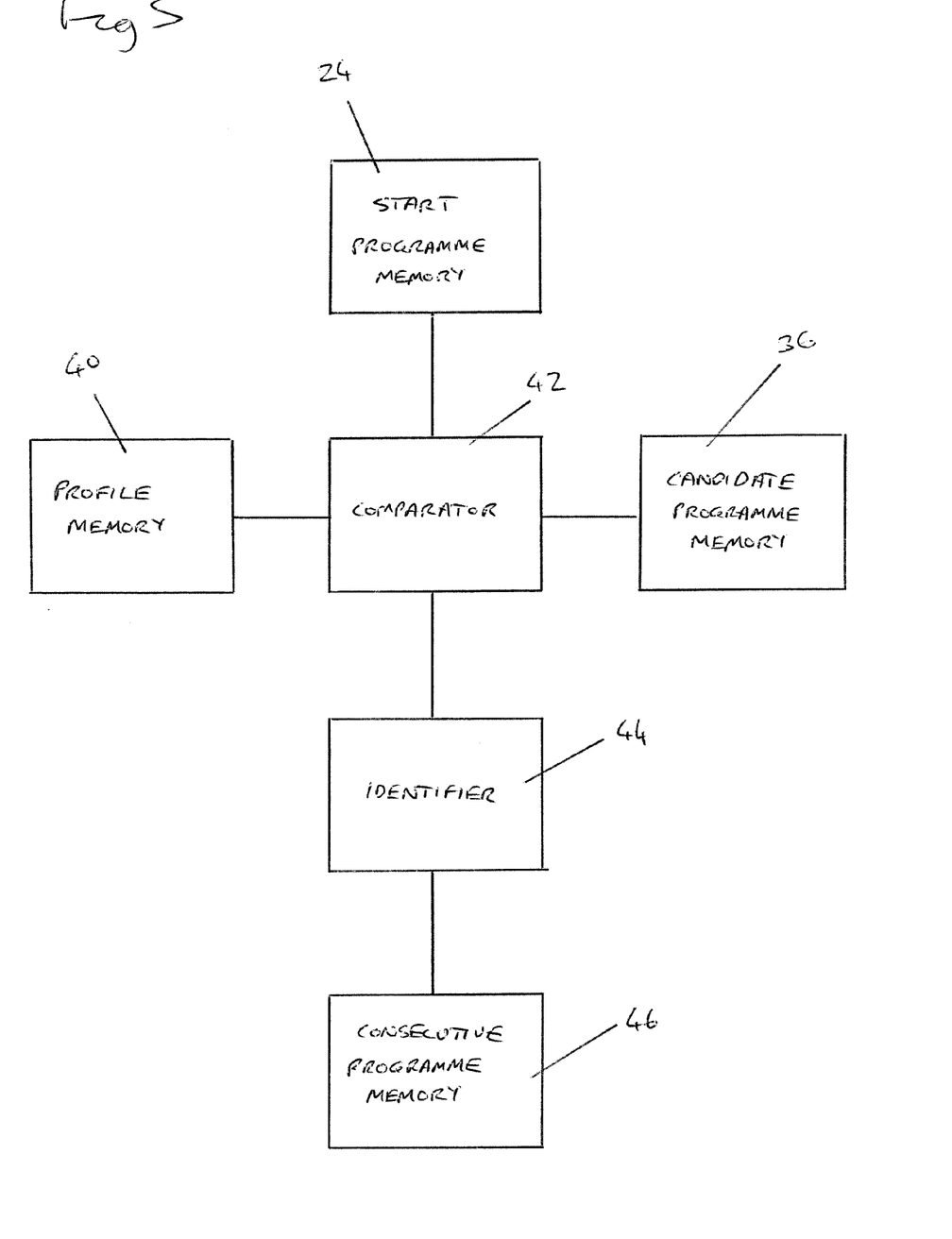
FIG. 5 illustrates schematically the consecutive programme processor of FIG. 2.
Figure 6:
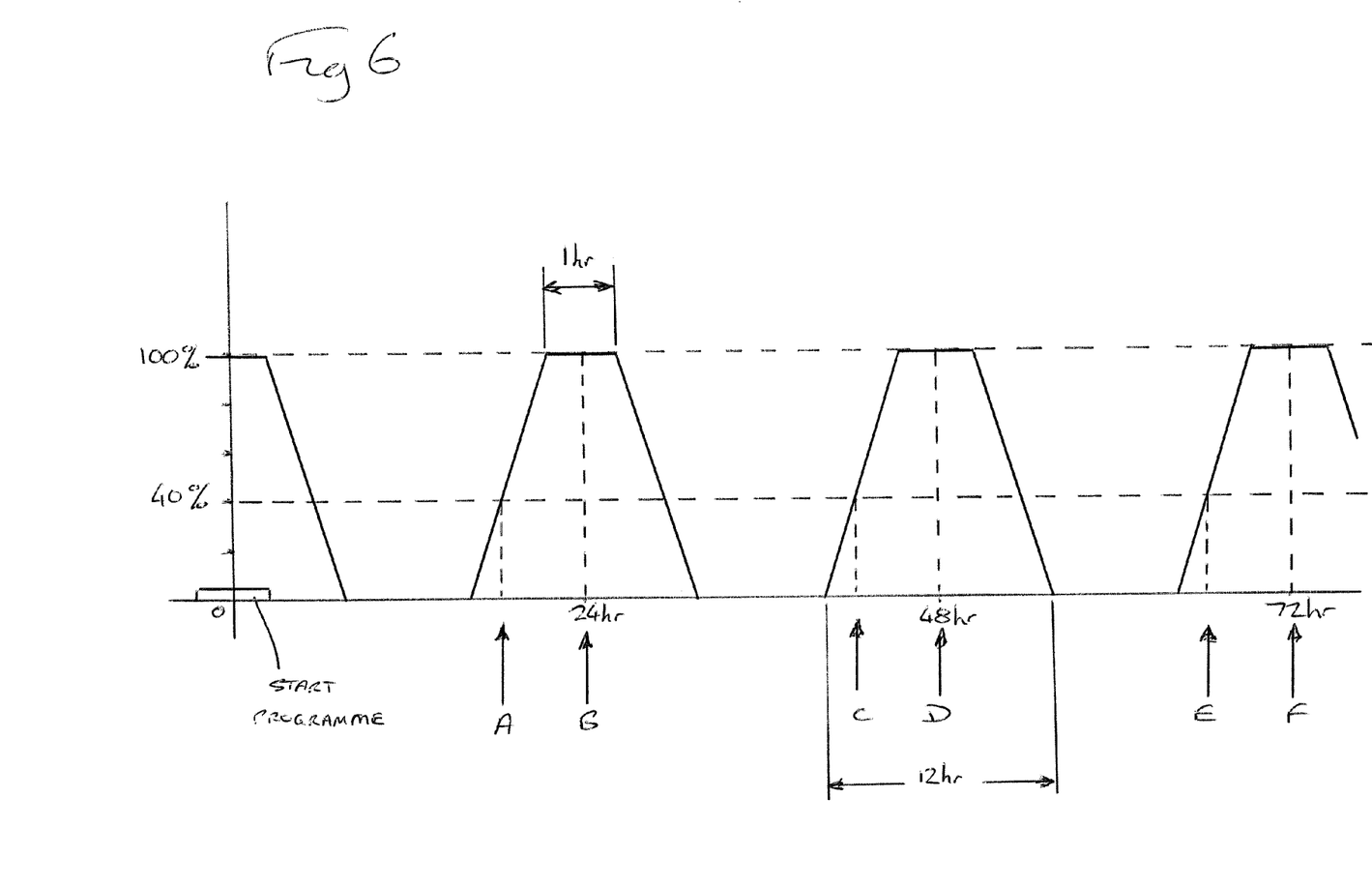
FIG. 6 illustrates an example of a timing profile.

The consecutive programme processor 38 includes a profile memory 40 for storing or at least creating a timing profile for expected consecutive programme occurrences, a comparator 42 for comparing the timing data stored for the candidate programmes with the timing profile to produce respective scores for each candidate programme and an identifier 44 for analysing those scores to identify at least the next consecutive programme. FIG. 6 illustrates an example of a possible timing profile.

In this illustrated embodiment, the timing profile has a pattern which is periodic and repeats with a period of 24 hours. In certain applications, other periods may be more appropriate and, indeed, profiles could be provided interactively according to programme data or user input.

The user profile is to be applied with its zero point in time based on the time of the start programme, for instance the mid-point of the start programme as illustrated. The profile then represents on its other axis (the Y axis as illustrated) the score value as a result of comparison with the timing data for the candidate programmes. In the preferred embodiment, the score value is given as a percentage value. Hence, an exact correlation between the timing profile and the timing data of a candidate programme results in a score of 100% for that candidate programme.

In the illustrated example, the timing of six candidate programmes (A, B, C, D, E and F) are illustrated. In this example, it is assumed that candidate programmes A, C and E are merely repeats of the start programme and candidate programmes B and D on the following afternoons. Hence, while candidate programmes B, D and F have timing data indicating a scheduled broadcast time at exactly the same time of day as the start programme, candidate programmes A, C and E have timing data indicating a scheduled broadcast time which is different to that of the start programme. Candidate programmes B, D and F having an exact correlation with the timing profile achieve scores of 100%, whereas candidate programmes A, C and E as illustrated receive score values of only 40%.

Figure 7:
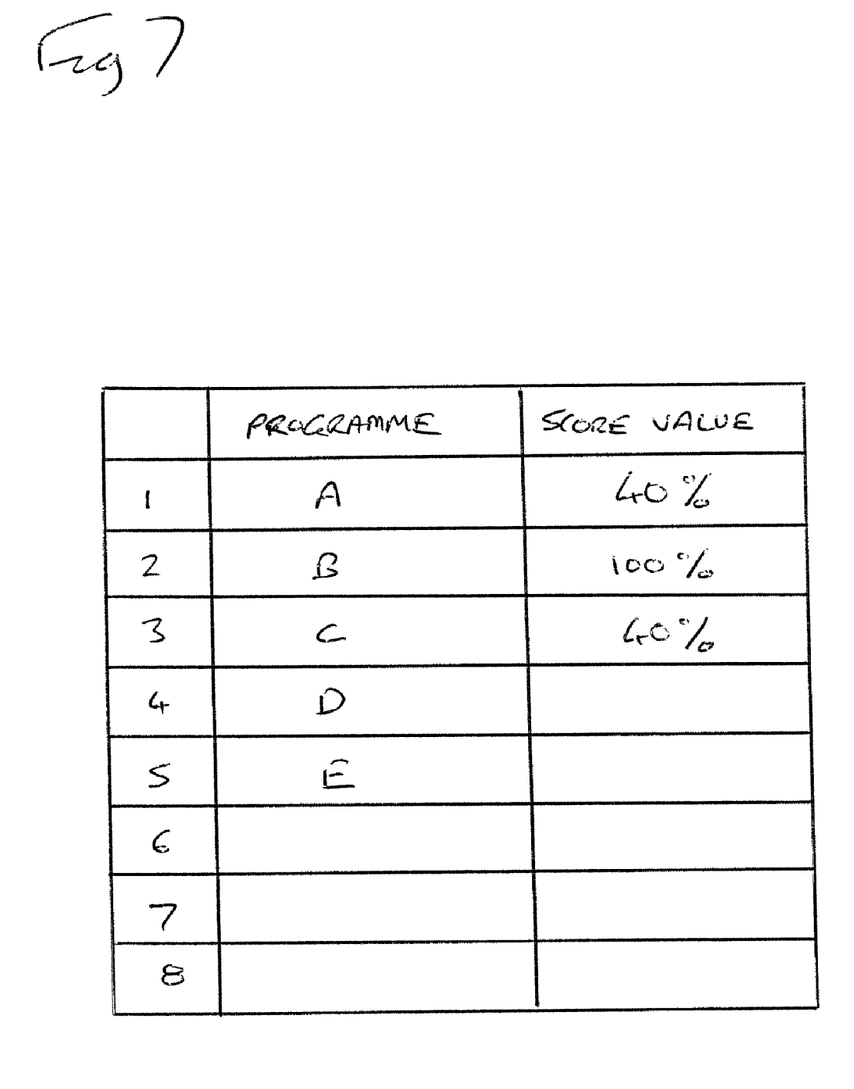
FIG. 7 illustrates schematically score values derived by the comparator of FIG. 5.

The comparator 42, as a result of this comparison with the timing profile, arrives at score values for each of the candidate programmes which can be illustrated as in the table of FIG. 7.

It should be appreciated that a wide variety of different timing profiles could be provided. The profile illustrated in FIG. 6 is a series of truncated triangles having their upper portions truncated at 100% and spanning a time comparable to a normal programme of a programme series, for instance 30 minutes either side of the centre.

It will be appreciated that consecutive programmes in a programme series are normally expected to occur at a time of day similar to that of the start programme. Therefore, the timing profile is chosen to drop off for times further away from the time of the start programme. In the illustrated example, a simple linear drop-off is provided, but timing profiles are possible with curves. Furthermore, the profile is arranged to drop off to a value of zero percent for times for instance 12 hours out of phase with the expected times. In the illustrated example, the timing profile is arranged to reach a score value of zero percent at times six hours either side of the start programme time and expected consecutive programme times. This can be varied according to the nature of the programmes and/or user requirements.

As an example, where it is known that consecutive programmes only occur once each week, the period of repetition of the timing profile can be set to one week, with each correlation hump having a wider extent either side of that one week expected timing. An advantage of the 24-period illustrated is that consecutive programmes of a programme series that repeats only once each week will still be detected for every seventh correlation hump.

The process conducted by the identifier 44 can be best described with reference to FIG. 8.

The score values of all of the candidate programmes (eight programmes A to H) in the preferred embodiment are considered simultaneously. This can be considered most easily by plotting the score values as illustrated in FIG. 8 with each of the candidate programmes A to H positioned along the X axis and the score values marked in the Y direction.

In the preferred embodiment, the identifier 44 considers score values by means of a number of ranked bands having ranges of score values. These bands and their corresponding ranges may be set in advance or varied according to the data or user preference.

The identifier 44 first considers the highest or first ranked band having the highest range of score values. In the illustrated example, this is the range of score values between 85% and 100%.

Figure 8:
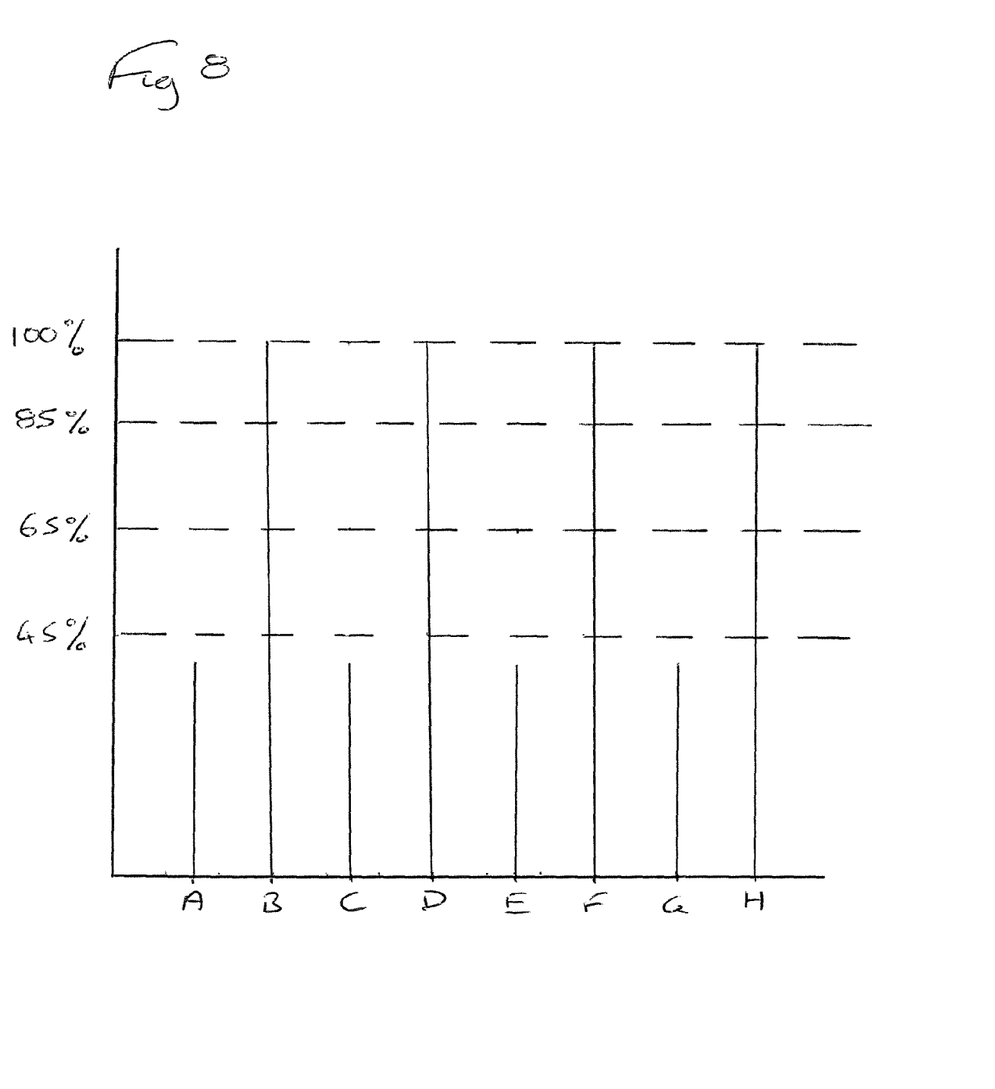
FIG. 8 illustrates schematically score values of candidate programmes.

The identifier 44 identifies all of the candidate programmes having score values within that band or at least identifies the first occurring candidate programme in that band, noting that in the example of FIG. 8, the X axis is also representative of time and the candidate programmes are arranged in their scheduled order of broadcast.

The data for the identified consecutive programmes is then stored in the consecutive programme memory 46 or at least a record is kept of a pointer to the appropriate data in the electronic programme guide.

In a preferred embodiment, only the next scheduled consecutive programme found in the score range is identified. Hence, only the next scheduled consecutive programme is predicted by the system.

Figure 9:
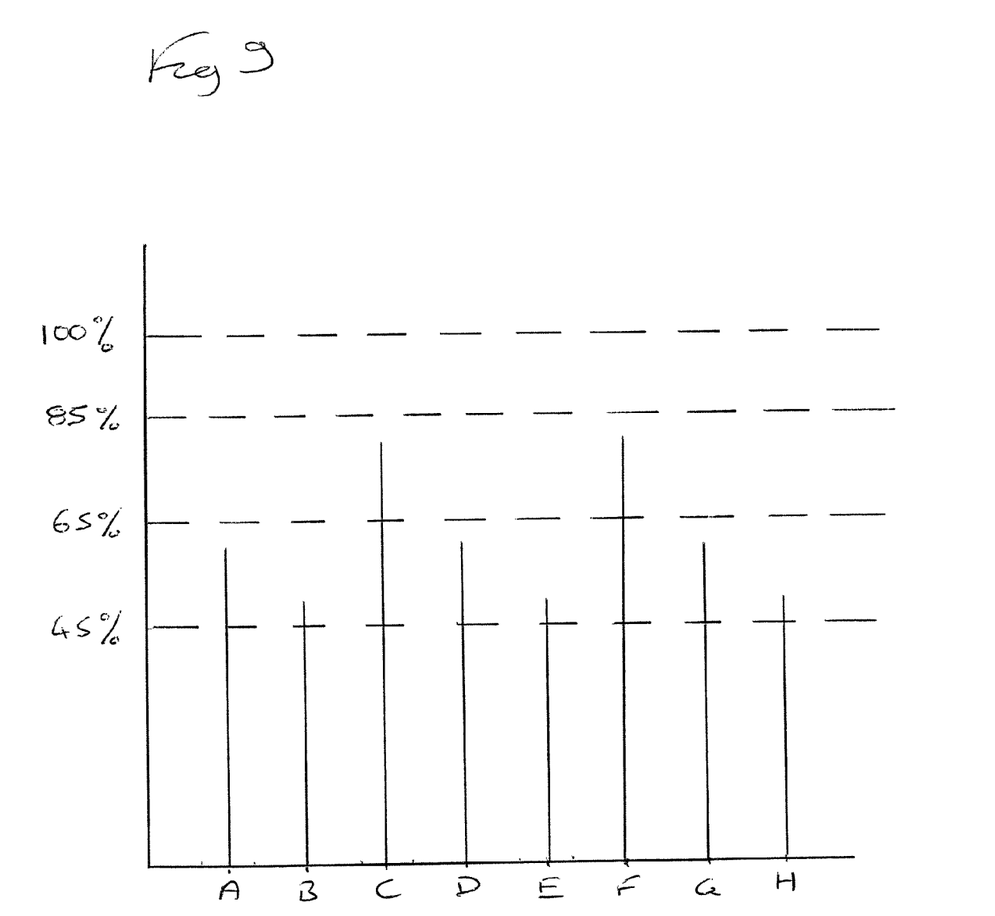
FIG. 9 illustrates score values of alternative candidate programmes.

To illustrate more fully how the identifier 44 is arranged to analyse the score values, reference will be made to the alternative example given in FIG. 9.

In this example, having considered the highest or first-ranked band of score values from 85% to 100%, no candidate programmes are identified. In this case, the identifier 44 refers to the next ranked band of score values, as illustrated having a range from 65% to 85%. As illustrated, candidate programmes C and F both have score values within this second range. Hence, the identifier 44 identifies candidate programme C as the next consecutive programme. Of course, if no candidate programmes were identified in the second-ranked band having score values from 65% to 85%, the identifier 44 would preferably go on to look in the next ranked band having score values from 45% to 65%.

In an alternative embodiment, slicing thresholds of 80%, 60% and 40% can be used, with values below 40% being ignored.

Returning to FIG. 2, it is noted that, in a preferred embodiment, the next consecutive programme as identified by the various processes of the invention can be used as the start programme for re-running those processes. The timing data, channel number, etc of the next consecutive programme can be stored for use by the video recorder 6, and the process is repeated to find yet another candidate programme in the programme series.

Using the system only to identify the next consecutive programme in a programme series, rather than a plurality of consecutive programmes, has particular advantage where a broadcaster chooses to broadcast an entire series of programmes back-to-back throughout one day. The second programme in the series may not receive a score value of 100%, but it will be close to the first correlation hump of the timing profile centred on the start programme and will receive a relatively high score value. In contrast, perhaps the third, fourth or fifth programme will be too far off the correlation hump of the timing profile to appear in the same score value band. If an attempt was made to identify all consecutive programmes at once, the third, fourth, fifth or subsequent programme would not be identified.

However, by re-using the next consecutive programme as the start programme each time, the base time or zero time for the timing profile is shifted each time the process is run such that each programme of the programme series is correctly identified.

It will be appreciated that the timing data, for instance as illustrated schematically in FIG. 4 in field 34, need not only consider start time. Duration time for a programme can be provided explicitly or at least calculated from start-time and end-time data.

According to one embodiment of the present invention, this additional data can be used to further improve the process carried out by the consecutive programme processor 38. In particular, once the comparator 42 has acquired the data including score values as illustrated schematically in FIG. 7, it is then arranged to compare the duration of the candidate programmes with the duration of the start programme. The comparator 42 is preferably arranged to provide a modifier to the initially determined score value according to differences between the durations of the programmes. Thus, if the start programme has a duration of 30 minutes, but the candidate programme has a duration of one hour, a modifier of for instance 80% could be applied. The score values considered by the identifier with reference to the ranked bands of score values are the modified score values. Hence, the identifier 44 will tend to select, as the next consecutive programme, a candidate programme having the same duration as the start programme. However, subject to what other candidate programmes have been found and the score values given to them, the identifier 44 is still able to identify as the next consecutive programme a candidate programme which has a different duration to the start programme and has had its score value modified by the modifier.

The modifier can be considered as a smearing factor by which to multiply the score value. In one embodiment, the following formula can be used as the smearing factor:

$$(n+1+M)/(2n+M)$$

where M is an arbitrary parameter and n is the ratio of durations (the largest, eg 30 minutes to 90 minutes, has n=3 and not ⅓). A value for M of 10 has been found to be preferred.

Further improvements in identifying consecutive programmes include comparing other information given both for the start programme and for programmes having programme entries in the electronic programme guide, for instance fields including descriptive information for the programme, genre information and other ancillary information.

The present invention is particularly effective when searching only for consecutive programmes in the same channel in which the start programme is transmitted. However, it is also possible to search for consecutive programmes in other channels, for instance for occasions where a programme series is moved temporarily to a different channel in order to allow transmission of an important live event on its normal channel.

When the invention is used to set automatically the recording of consecutive programmes in a broadcast series, it is possible that the timing of this recording conflicts with the timing of a recording set manually by the user. It is possible for the system to prioritise the manual recording over the automatic recording or vice versa.

I claim:

1. A television device configured to receive and store an electronic program guide including a plurality of program entries for respective television programs, each program entry having at least a title field including title data for the title of the respective program and having at least a timing field including timing data for timing of the respective program, the television device comprising:
   a user interface configured to be controllable by a user to select a start program from the electronic program guide;
   a candidate program processor including a candidate searcher and a candidate identifier wherein the candidate searcher is configured to initially search the title fields of the plurality of program entries included in the electronic program guide for data matching data of the title field for the start program and the candidate identifier is configured to identify, as candidate programs, programs having program entries with data matching data of the title field of the start program; and
   a consecutive program processor including a profile memory, a comparator and a consecutive program identifier wherein profile memory is configured to store a predetermined timing profile for expected consecutive program occurrences, the comparator is configured to compare timing data of timing fields of the program entries of the candidate programs with the predetermined timing profile and the consecutive program identifier is configured to identify, as a consecutive program, a candidate program having a program entry with timing data correlating with the predetermined timing profile,
   wherein the timing profile takes the shape of a plurality of truncated triangles respectively centered and having truncated flat tops at the expected occurrence of consecutive programs.

2. A television device according to claim 1 wherein the comparator is configured to compare the timing data of the timing fields of each candidate program with the predetermined timing profile and is configured to generate a score value for each respective candidate program based on a correlation between the timing data and the predetermined timing profile.

3. A television device according to claim 2 wherein the consecutive program processor further includes:
   a band memory, the band memory storing definitions of a plurality of adjacent ranges of score values belonging to a corresponding ranked plurality of respective bands; and
   a score value comparator configured to compare the score values of respective candidate programs with at least the highest range of score values and configured to assign to the respective band having the highest range of score values each candidate program having a score value falling within the highest range of score values.

4. A television device according to claim 3 wherein the score value comparator is responsive to non-assignment by the score value comparator of any candidate programs to said respective band having the highest range of score values, to compare the score values of respective candidate programs with an adjacent range of score values lower than the highest range of score values and belonging to a lower-ranked predetermined band and to assign to said lower-ranked predetermined band each candidate program having a score value falling within the adjacent range of score values belonging to said lower-ranked predetermined band.

5. A television device according to claim 3 wherein the consecutive program identifier is configured to identify, as the next consecutive program, the next scheduled program assigned to the highest ranked band to which any program is assigned.

6. A television device according to claim 1 wherein the timing profile includes at least a plurality of expected values defined for respective consecutive times and having a repeating pattern with respect to time, the pattern having a repetition period equal to expected occurrences of consecutive programs of a program series.

7. A television device according to claim 6 wherein the expected values all have respective amounts selected from zero to a maximum amount.

8. A television device according to claim 7 wherein, at reoccurring time intervals corresponding to said repetition period, the expected values are the maximum amount.

9. A television device according to claim 8 wherein said respective reoccurring time intervals have a predetermined extent.

10. A television device according to claim 8 wherein adjacent expected values in directions away from said respective reoccurring time intervals have progressively smaller amounts.

11. A television device according to claim 6 wherein adjacent expected values form a substantially continuous profile.

12. A television device according to claim 1 wherein the candidate identifier is configured to identify no more than a predetermined number of candidate programs by identifying the predetermined number of candidate programs scheduled first for broadcast.

13. A television device according to claim 1 further including:
   a record controller configured to control recording of a broadcast program on the basis of the timing data in the timing field of the broadcast entry for said broadcast program in the electronic program guide.

14. A television device according to claim 13 wherein the record controller is responsive to selection of a start program by the user interface to control recording of the start program and consecutive programs identified by the consecutive program identifier.

15. The television device of claim 1 wherein the timing profile includes the truncated flat tops each spanning a time comparable to a duration time of the start program.

16. The television device of claim 1 wherein the timing profile includes each truncated flat top spanning at least 60 minutes.

17. The television device of claim 16 wherein the timing profile includes the truncated flat top of each truncated triangle spanning a time comparable to a duration time of the start program and a base of each truncated triangle spanning 12 hours.

18. The television device of claim 1 wherein the candidate searcher is configured to search only the title fields of the electronic program guide.

19. The television device of claim 1 wherein the candidate searcher is configured to additionally search one or more descriptive information fields.

20. The television device of claim 1 wherein each program entry further has at least a channel field including channel data for the channel for the respective program and
the candidate searcher is further configured to initially search the title fields of the plurality of program entries included in the electronic program guide for data matching data of the title field for the start program without limiting the search to the program entries having timing data matching data of the timing field for the start program or channel data matching data of the channel field for the start program.

21. A video recorder configured to receive and store an electronic program guide including a plurality of program entries for respective television programs, each program entry having at least a title field including title data for the title of the respective program and having at least a timing field including timing data for timing of the respective program, the television device comprising:
a user interface configured to be controllable by a user to select a start program from the electronic program guide;
a candidate program processor including a candidate searcher and a candidate identifier wherein the candidate searcher is configured to initially search the title fields of the plurality of program entries included in the electronic program guide for data matching data of the title field for the start program and the candidate identifier is configured to identify, as candidate programs, programs having program entries with data matching data of the title field of the start program; and
a consecutive program processor including a profile memory, a comparator and a consecutive program identifier wherein profile memory is configured to store a predetermined timing profile for expected consecutive program occurrences, the comparator is configured to compare timing data of timing fields of the program entries of the candidate programs with the predetermined timing profile and the consecutive program identifier is configured to identify, as a consecutive program, a candidate program having a program entry with timing data correlating with the predetermined timing profile,
wherein the timing profile takes the shape of a plurality of truncated triangles respectively centered and having truncated flat tops at the expected occurrence of consecutive programs.

22. A television receiver configured to receive and store an electronic program guide including a plurality of program entries for respective television programs, each program entry having at least a title field including title data for the title of the respective program and having at least a timing field including timing data for timing of the respective program, the television device comprising:
a user interface configured to be controllable by a user to select a start program from the electronic program guide;
a candidate program processor including a candidate searcher and a candidate identifier wherein the candidate searcher is configured to initially search the title fields of the plurality of program entries included in the electronic program guide for data matching data of the title field for the start program and the candidate identifier is configured to identify, as candidate programs, programs having program entries with data matching data of the title field of the start program; and
a consecutive program processor including a profile memory, a comparator and a consecutive program identifier wherein profile memory is configured to store a predetermined timing profile for expected consecutive program occurrences, the comparator is configured to compare timing data of timing fields of the program entries of the candidate programs with the predetermined timing profile and the consecutive program identifier is configured to identify, as a consecutive program, a candidate program having a program entry with timing data correlating with the predetermined timing profile,
wherein the timing profile takes the shape of a plurality of truncated triangles respectively centered and having truncated flat tops at the expected occurrence of consecutive programs.

23. A personal computer having program code means stored therein which, when loaded and run, configure the personal computer to receive and store an electronic program guide including a plurality of program entries for respective television programs, each program entry having at least a title field including title data for the title of the respective program and having at least a timing field including timing data for timing of the respective program, and configure the personal computer with:
a user interface configured to be controllable by a user to select a start program from the electronic program guide;
a candidate program processor including a candidate searcher and a candidate identifier wherein the candidate searcher is configured to initially search the title fields of the plurality of program entries included in the electronic program guide for data matching data of the title field for the start program and the candidate identifier is configured to identify, as candidate programs, programs having program entries with data matching data of the title field of the start program; and
a consecutive program processor including a profile memory, a comparator and a consecutive program identifier wherein profile memory is configured to store a predetermined timing profile for expected consecutive program occurrences, the comparator is configured to compare timing data of timing fields of the program entries of the candidate programs with the predetermined timing profile and the consecutive program identifier is configured to identify, as a consecutive program, a candidate program having a program entry with timing data correlating with the predetermined timing profile,
wherein the timing profile takes the shape of a plurality of truncated triangles respectively centered and having truncated flat tops at the expected occurrence of consecutive programs.

24. A device configured to receive and store an electronic program guide including a plurality of program entries for respective television programs, each program entry having at least a title field including title data for the title of the respective program and having at least a timing field including timing data for timing of the respective program, the device comprising:
an interface configured to receive information representative of a start program in the electronic program guide;
a candidate program processor including a candidate searcher and a candidate identifier wherein the candidate searcher is configured to initially search the title fields of the plurality of program entries included in the electronic program guide for data matching data of the title field for the start program and the candidate identifier is configured to identify, as candidate programs, programs having program entries with data matching data of the title field of the start program;

a consecutive program processor including a profile memory, a comparator and a consecutive program identifier wherein the profile memory is configured to store a predetermined timing profile for expected consecutive program occurrences, the comparator is configured to compare timing data of timing fields of the program entries of the candidate programs with the predetermined timing profile and the consecutive program identifier is configured to identify, as a consecutive program, a candidate program having a program entry with timing data correlating with the predetermined timing profile; and an interface configured to send to a remote television recording device information corresponding to recording instructions for recording of at least the identified candidate program by the television recording device, wherein the timing profile takes the shape of a plurality of truncated triangles respectively centered and having truncated flat tops at the expected occurrence of consecutive programs.

25. A device according to claim 24 comprising one of a computer server, a mobile telephone, a television receiver device and a personal computer configured for connection to the internet.

26. A television system including:
a device configured to receive and store an electronic program guide, including a plurality of program entries for respective television programs, each program entry having at least a title field including title data for the title of the respective program and having at least a timing field including timing data for timing of the respective program, the device comprising:
an interface configured to receive information representative of a start program in the electronic program guide;
a candidate program processor including a candidate searcher and a candidate identifier wherein the candidate searcher is configured to initially search the title fields of the plurality of program entries included in the electronic program guide for data matching data of the title field for the start program and the candidate identifier is configured to identify, as candidate programs, programs having program entries with data matching data of the title field of the start program;
a consecutive program processor including a profile memory, a comparator and a consecutive program identifier wherein the profile memory is configured to store a predetermined timing profile for expected consecutive program occurrences, the comparator is configured to compare timing data of timing fields of the program entries of the candidate programs with the predetermined timing profile and the consecutive program identifier is configured to identify, as a consecutive program, a candidate program having a program entry with timing data correlating with the predetermined timing profile; and
an interface configured to send to a remote television recording device information corresponding to recording instructions for recording of at least the identified candidate program by the television recording device; and
a television device having an interface configured to receive said information corresponding to recording instructions and configured to record at least the identified candidate program according to said information, wherein the timing profile takes the shape of a plurality of truncated triangles respectively centered and having truncated flat tops at the expected occurrence of consecutive programs.

27. A method of identifying, from a start program as previously selected from an electronic program guide including a plurality of program entries, consecutive programs of a program series of which said start program is a part, the electronic program guide including, for each program, a program entry with a title field including title data for the title of the program and a timing field including timing data for the timing of the program, the method including:
initially searching the title fields of the plurality of program entries included in the electronic program guide for data matching data of the title field for the start program;
identifying as candidate programs, programs having program entries with data matching data of the title field of the start program;
comparing timing data of timing fields of the program entries of the candidate programs with a predetermined timing profile for expected consecutive program occurrences; and
identifying, as a consecutive program, a candidate program having a program entry with timing data correlating with the predetermined expected profile,
wherein the timing profile takes the shape of a plurality of truncated triangles respectively centered and having truncated flat tops at the expected occurrence of consecutive programs.

28. A method according to claim 27 further including:
sending to a remote television recording device information corresponding to recording instructions for recording of at least the identified candidate program by the television recording device.

29. A non-transitory computer-readable medium having a computer program stored thereon, the computer program causing a computer to perform a method comprising:
identifying, from a start program as previously selected from an electronic program guide including a plurality of program entries, consecutive programs of a program series of which said start program is a part, the electronic program guide including, for each program, a program entry with a title field including title data for the title of the program and a timing field including timing data for the timing of the program;
initially searching the title fields of the plurality of program entries included in the electronic program guide for data matching data of the title field for the start program;
identifying as candidate programs, programs having program entries with data matching data of the title field of the start program;
comparing timing data of timing fields of the program entries of the candidate programs with a predetermined timing profile for expected consecutive program occurrences; and
identifying, as a consecutive program, a candidate program having a program entry with timing data correlating with the predetermined expected profile,
wherein the timing profile takes the shape of a plurality of truncated triangles respectively centered and having truncated flat tops at the expected occurrence of consecutive programs.

30. A non-transitory computer-readable medium having program code means stored thereon, the program code causing a computer to perform a method comprising:
identifying, from a start program as previously selected from an electronic program guide including a plurality of program entries, consecutive programs of a program series of which said start program is a part, the electronic program guide including, for each program, a program entry with a title field including title data for the title of the program and a timing field including timing data for the timing of the program;

initially searching the title fields of the plurality of program entries included in the electronic program guide for data matching data of the title field for the start program;

identifying as candidate programs, programs having program entries with data matching data of the title field of the start program;

comparing timing data of timing fields of the program entries of the candidate programs with a predetermined timing profile for expected consecutive program occurrences; and identifying, as a consecutive program, a candidate program having a program entry with timing data correlating with the predetermined expected profile, wherein the timing profile takes the shape of a plurality of truncated triangles respectively centered and having truncated flat tops at the expected occurrence of consecutive programs.

* * * * *